US006795917B1

(12) United States Patent
Ylonen

(10) Patent No.: US 6,795,917 B1
(45) Date of Patent: Sep. 21, 2004

(54) METHOD FOR PACKET AUTHENTICATION IN THE PRESENCE OF NETWORK ADDRESS TRANSLATIONS AND PROTOCOL CONVERSIONS

(75) Inventor: Tatu Ylonen, Espoo (FI)

(73) Assignee: SSH Communications Security LTD, Espoo (FI)

( * ) Notice: Subject to any disclaimer, the term of this patent is extended or adjusted under 35 U.S.C. 154(b) by 0 days.

(21) Appl. No.: 09/319,575

(22) PCT Filed: Dec. 30, 1998

(86) PCT No.: PCT/FI98/01032

§ 371 (c)(1),
(2), (4) Date: Oct. 21, 1999

(87) PCT Pub. No.: WO99/35799

PCT Pub. Date: Jul. 15, 1999

(30) Foreign Application Priority Data

Dec. 31, 1997 (FI) ................................. 974665

(51) Int. Cl.[7] .............................................. H04L 9/00
(52) U.S. Cl. ..................................... 713/160; 713/201
(58) Field of Search ................................ 713/160, 201

(56) References Cited

U.S. PATENT DOCUMENTS

| 5,577,209 A | * | 11/1996 | Boyle et al. ................ 713/201 |
| 5,633,931 A |   | 5/1997  | Wright ........................ 380/25  |
| 5,793,763 A |   | 8/1998  | Mayes et al. ................ 370/389 |
| 5,864,683 A | * | 1/1999  | Boebert et al. ............. 709/249 |
| 5,940,591 A | * | 8/1999  | Boyle et al. ................ 713/201 |
| 6,088,687 A | * | 7/2000  | Leleu ........................ 705/400 |
| 6,163,843 A | * | 12/2000 | Inoue et al. ................ 713/201 |
| 6,167,513 A | * | 12/2000 | Inoue et al. ................ 713/150 |
| 6,170,057 B1 | * | 1/2001 | Inoue et al. ................ 713/153 |
| 6,351,813 B1 | * | 2/2002 | Mooney et al. ............. 713/185 |

FOREIGN PATENT DOCUMENTS

| EP | A-0825745   | 2/1998 | .......... H04L/29/06 |
| JP | A-09214556  | 8/1997 | .......... H04L/12/56 |
| WO | WO 94/10778 | 5/1994 |                      |

* cited by examiner

Primary Examiner—Thomas R. Peeso
Assistant Examiner—Kambiz Zand
(74) Attorney, Agent, or Firm—Ronald C. Fish; Ronald Craig Fish, A Law Corp.

(57) ABSTRACT

For achieving packet authentication according to an applicable security policy between a sending node (903) and a receiving node (902) in a network, the following steps are taken:

Figure 1:
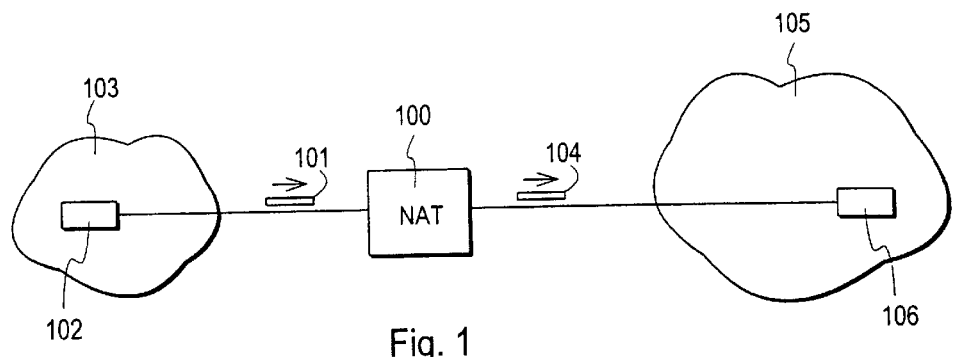

the transformations occurring to a packet en route between the sending node and the receiving node are discovered dynamically (1003, 1004), the discovered transformations are checked (1004) to be acceptable based on the applicable security policy, and the dynamically discovered, acceptable transformations are compensated for (1004, 1006) before authenticating packets transmitted from the sending node to the receiving node.

22 Claims, 6 Drawing Sheets

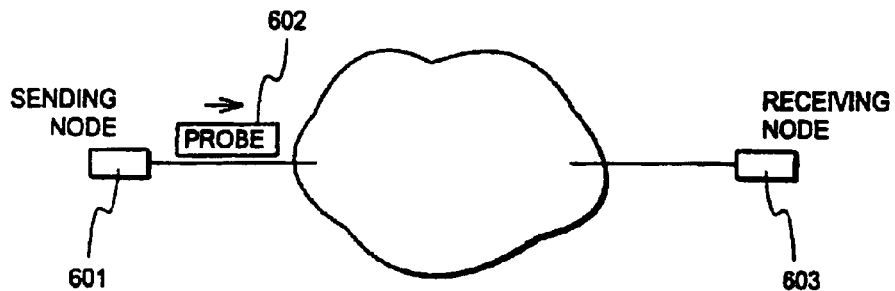
Fig. 6
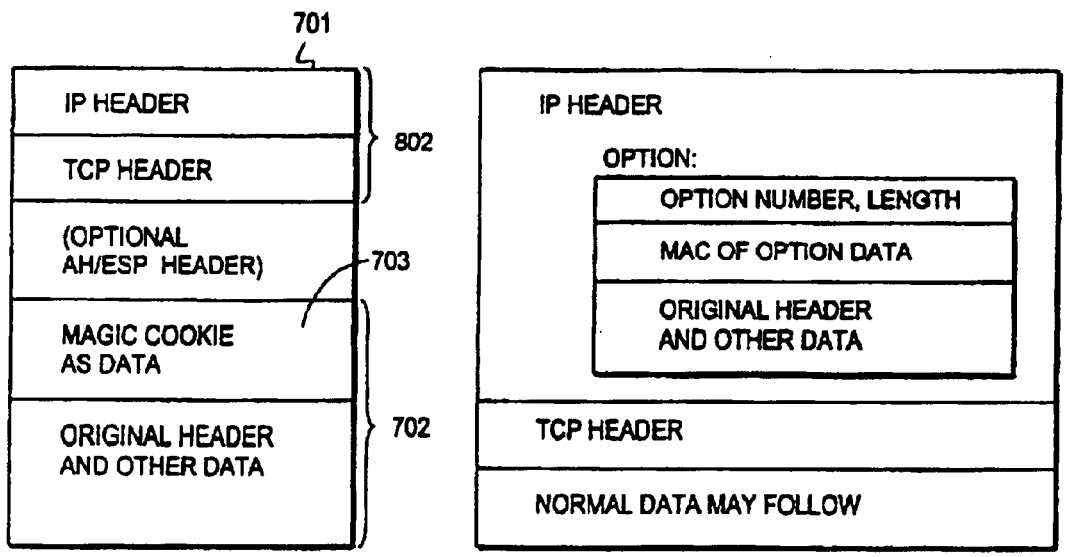
Fig. 7
Fig. 8
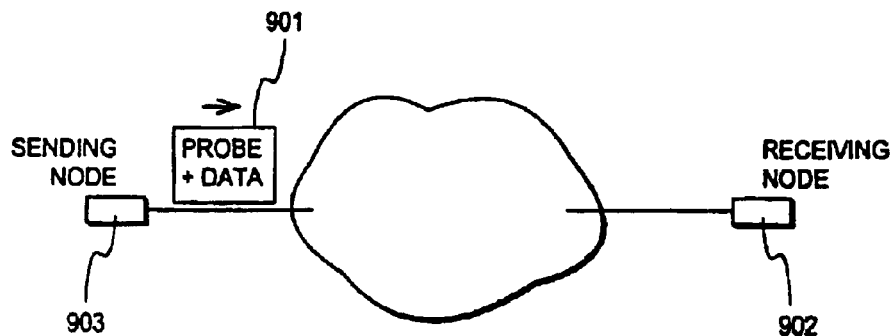
Fig. 9

METHOD FOR PACKET AUTHENTICATION IN THE PRESENCE OF NETWORK ADDRESS TRANSLATIONS AND PROTOCOL CONVERSIONS

This invention concerns the authentication of data packets in a digital data transfer network. Specifically the invention concerns the authentication in a network where transformations are performed on packets while they are in transit, which renders the use of prior art authentication methods difficult or impossible.

Internet security has received major scientific and commercial attention in recent years due to the vast growth of the Internet and the rapidly increasing number of organizations joining the network. The network has become a critical part of the operation of many commercial organizations. Commercial exploitation of the Internet is being severely limited by security problems in existing Internet protocols, and improving Internet security is thus imperative.

The IP security protocol (IPSEC) is being standardized by the IETF (Internet Engineering Task Force) for adding security to the IP protocol. It provides cryptographic authentication and confidentiality of traffic between two communicating network nodes. It can be used in both end-to-end mode, directly between the communicating nodes or hosts, or in tunnel mode between firewalls or VPN (Virtual Private Network) devices. Asymmetric connections, where one end is a host and the other end is a firewall or VPN are also possible.

IPSEC performs authentication and encryption on packet level by adding new protocol headers to each packet. IPSEC authentication is performed by computing an authentication code over all data and most of the header of the data packet. The authentication code further depends on a secret key, known only to the communicating parties. The authentication code is then stored in the packet, appropriately wrapped in a well-defined header or trailer.

The secret key for authentication can be configured manually for each pair of communicating hosts. However, in practice, special key management protocols are used to dynamically generate and exchange the secret keys. In IPSEC, the standard protocol for doing this is called the ISAKMP/Oakley protocol, where ISAKMP means Internet Security Association Key Management Protocol.

IPSEC authentication protection includes the source and destination addresses of the packet, which means that they can not be changed en route if the authentication code is to remain valid. However, many organizations currently use private IP addresses within their own organization, and translate the private addresses to globally unique addresses at an external gateway (e.g. router or firewall). This process is called network address translation (NAT). Such translation typically involves changing both IP addresses and TCP or UDP port numbers.

A NAT device 100 in FIG. 1 takes in packets 101 transmitted by a transmitting node 102 in an internal private network 103. It converts the IP addresses and port numbers in these packets from those belonging to an internal, private address space to globally unique external Internet addresses in outgoing packets 104 before sending the packets through the external network 105 to a receiving node 106. The address conversion takes place on the other way round for packets that go across the NAT device 100 in the other direction. Typically, a NAT 100 will map IP address and port combinations to different IP address and port combinations. The mapping will remain constant for the duration of a network connection, but may change (slowly) with time. In practice, NAT functionality is often integrated into a firewall or router.

Figure 2:
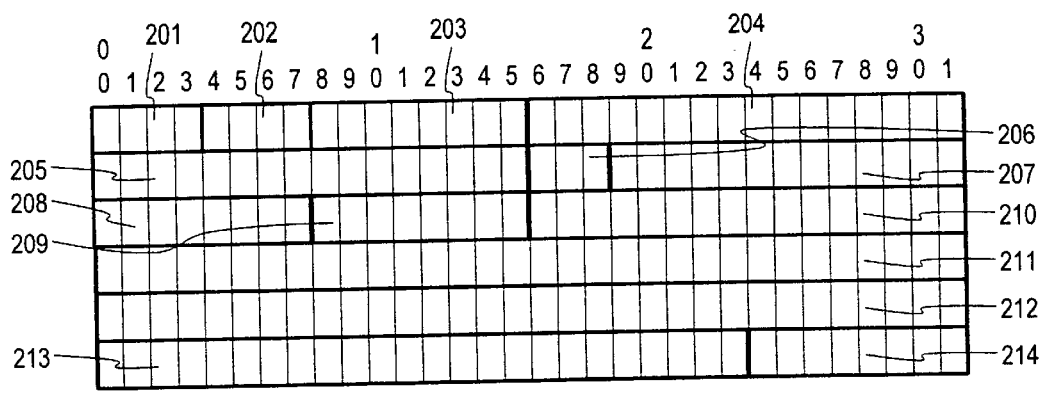

Furthermore, there are other types of devices on the Internet that may legally modify packets as they are transmitted. A typical example is a protocol converter, whose main job is to convert the packet to a different protocol without disturbing normal operation. Using them leads to problems very similar to the NAT case. A protocol converter converts packets from one protocol to a different protocol. A fairly simple but important example is converting between IPv4 and Ipv6, which are different versions of the Internet Protocol. Such converters will be extremely important and commonplace in the near future. A packet may undergo several conversions of this type during its travel, and it is possible that the endpoints of the communication actually use a different protocol. Like NAT, protocol conversion is often performed in routers and firewalls. The layout of an IPv4 packet header is illustrated in FIG. 2, and the layout of an IPv6 packet header in FIG. 3. Column numbers in FIGS. 2 and 3 correspond to bits.

Figure 3:
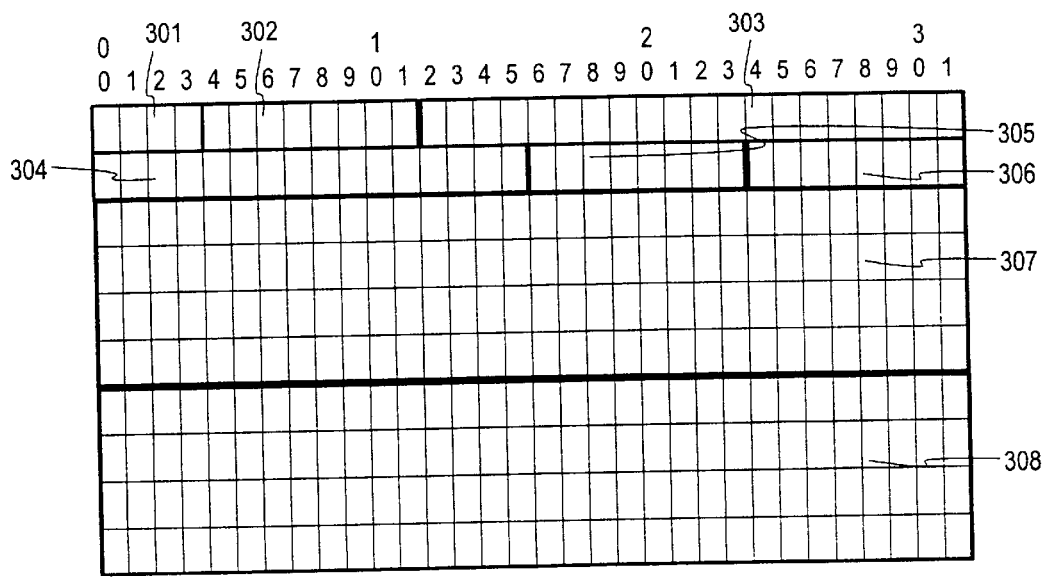

In FIG. 2, the fields of the known IPv4 header are as follows: Version Number 201, IHL 202, Type of Service 203, Total Length 204, Identification 205, Flags 206, Fragment Offset 207, Time to Live 208, Protocol 209, Header Checksum 210, Source Address 211, Destination Address 212, Options 213 and Padding 214. In FIG. 3, the fields of the known proposed IPv6 header are as follows: Version Number 301, Traffic Class 302, Flow Label 303, Payload Length 304, Next Header 305, Hop Limit 306, Source Address 307 and Destination Address 308. The use of the fields in the headers is known to the person skilled in the art. An IP packet consists of a header like that of FIG. 2 or 3 accompanied by a data portion. In IPv6, there may be a number of so-called Extension headers between the main header shown in FIG. 3 and the data portion.

Figure 4:
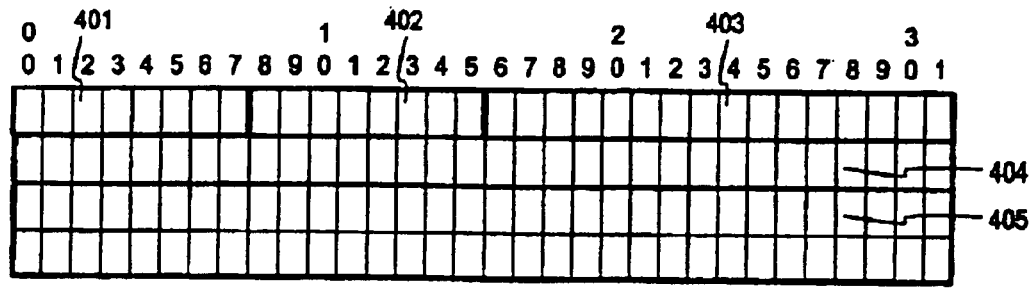

The security features desired of a network security protocol include authenticity (the packet was actually sent by the node it claims to have been sent by), integrity (the packet was not modified in transit), non-repudiation (the sending node cannot deny having sent the packet) and privacy (no third party can read the contents of the packet). In the IPSEC protocol, authenticity, integrity, and non-repudiation are achieved by having a shared secret key that is used to authenticate each packet. The authentication is performed by computing a message authentication code (MAC) using the contents of the packet and the shared secret, and sending the computed MAC as a part of the packet in an AH (Authentication Header) or ESP (Encapsulating Security Payload) header. Privacy is typically implemented using encryption, and the ESP header is used. The AH header is illustrated in FIG. 4, where column numbers correspond to bits. The fields of the known AH header are as follows: Next Header 401, Length 402, Reserved 403, Security Parameters 404 and Authentication Data 405. The length of the last field 405 is a variable number of 32-bit words.

Figure 5A:
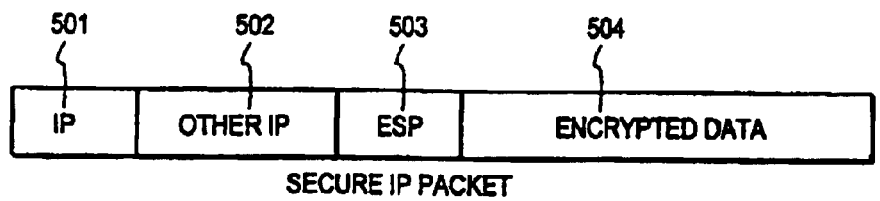
Figure 5B:
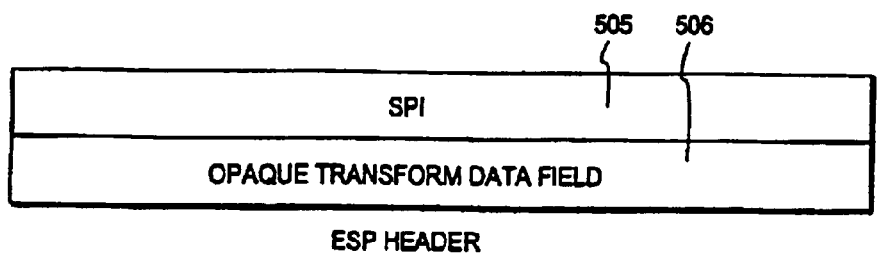

The Encapsulating Security Payload (ESP) may appear anywhere in an IP packet after the IP header and before the final transport-layer protocol. The Internet Assigned Numbers Authority has assigned Protocol Number 50 to ESP. The header immediately preceding an ESP header will always contain the value 50 in its Next Header (IPv6) or Protocol (IPv4) field. ESP consists of an unencrypted header followed by encrypted data. The encrypted data includes both the protected ESP header fields and the protected user data, which is either an entire IP datagram or an upper-layer protocol frame (e.g., TCP or UDP). A high-level diagram of a secure IP datagram is illustrated in FIG. 5a, where the fields are IP Header 501, optional other IP headers 502, ESP header 503 and ecrypted data 504. FIG. 5b illustrates the two parts of an ESP header, which are the 32-bit Security Association Identifier (SPI) 505 and the Opaque Transform Data field 506, whose length is variable.

There are several ways of computing a MAC, well known in the literature. One commonly used method is computing a keyed cryptographic hash function (e.g. HMAC-SHA1) over the data to be authenticated, using the shared secret as the key.

We will call authenticity, integrity, and non-repudiation of packets jointly as packet authentication. In IPSEC, this function is achieved by computing a message authentication code (MAC) for the packet at the sending node, including the computed message authentication code with the packet in an AH or ESP header, and verifying the message authentication code at the receiving node. The verification will succeed if both nodes know the same shared secret and the received packet is identical to the packet from which the MAC was computed.

NATs and protocol converters by their very nature modify packets as they are being transferred. However, the very purpose of packet authentication is to prevent modifications to the packet, and any transformations on the packet will cause the authentication to fail. NAT changes the source and/or destination addresses of a packet, thus invalidating the IPSEC authentication code. Several solutions have been proposed for performing authentication in such an environment, such as not including the addresses in the authentication code, performing authentication between each pair of adjacent NAT gateways, or wrapping the packets in an IP-in-IP encapsulation. However, no solution is known that would allow end-to-end authentication in the presence of an unknown number of intermediate NAT gateways, without requiring complex directories or manual configuration, or reauthenticating at each gateway that modifies the packet.

The ESP authentication method does not include the packet header in the computed MAC. The original goal of this was to make ESP work across NAT. However, there are serious problems with this approach. First, TCP/IP header contains a checksum which includes, in addition to the actual TCP payload, a pseudo-header which includes the network addresses and port numbers of the packet. Thus, the TCP/IP checksum changes when NAT is performed. Normally a NAT device would automatically correct the checksum, but this is impossible when the packet is protected using a security protocol. The same situation is encountered with the UDP protocol. Thus, TCP and UDP cannot be reliably used even over ESP with existing methods.

There is a strong force driving vendors and corporations towards using technologies which modify data packets: the IPv4 address space is running out. Thus, corporations will no longer be able to obtain sufficiently many IP addresses at a reasonable cost. Another force driving corporations in the same direction is that renumbering IP addresses is very costly, and corporations may need to change their external numbers if they change to a different Internet service provider.

These forces are driving the Internet towards two possible alternative solutions: increasing use of NAT, or a transition to IPv6 (implying a long transition period during which protocol conversion is commonplace). The present IPSEC protocol cannot cope with either of these solutions without major compromises in flexibility or security.

It is an object of this invention to provide a method for packet authentication that is insensitive to address transformations and protocol conversions en route of the packet. It is a further object of the invention to provide a transmitting network device and a receiving network device that are able to take advantage of the aforementioned method.

The objects of the invention are achieved by first dynamically discovering the address translations and/or protocol conversions that are performed on packets between the communicating hosts, and compensating for these changes when the packet authentication code is computed or verified.

It is characteristic to the method according to the invention that it comprises the steps of dynamically discovering the transformations occurring to a packet en route between the sending node and the receiving node, checking that the discovered transformations are acceptable based on the applicable security policy, and compensating for the dynamically discovered, acceptable transformations before authenticating packets transmitted from the sending node to the receiving node.

The invention also applies to a network device, the characteristic feature of which is its ability to take advantage of the aforementioned method.

A first part of the invention is that the network devices or nodes taking part in the communication where packets need to be authenticated dynamically discover the network address translation and or protocol conversion characteristics of a network path by exchanging a probe, and comparing information in the received probe against its known form at the moment of sending.

A second part of the invention is that, after discovering the network address translation and or protocol conversion characteristics of a network path, the transmitting node and/or the receiving node compensates for all address translations and/or protocol conversions performed on the packet, so that packet authentication can still be achieved securely in the presence of address translations and/or protocol conversions.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

Figure 10:
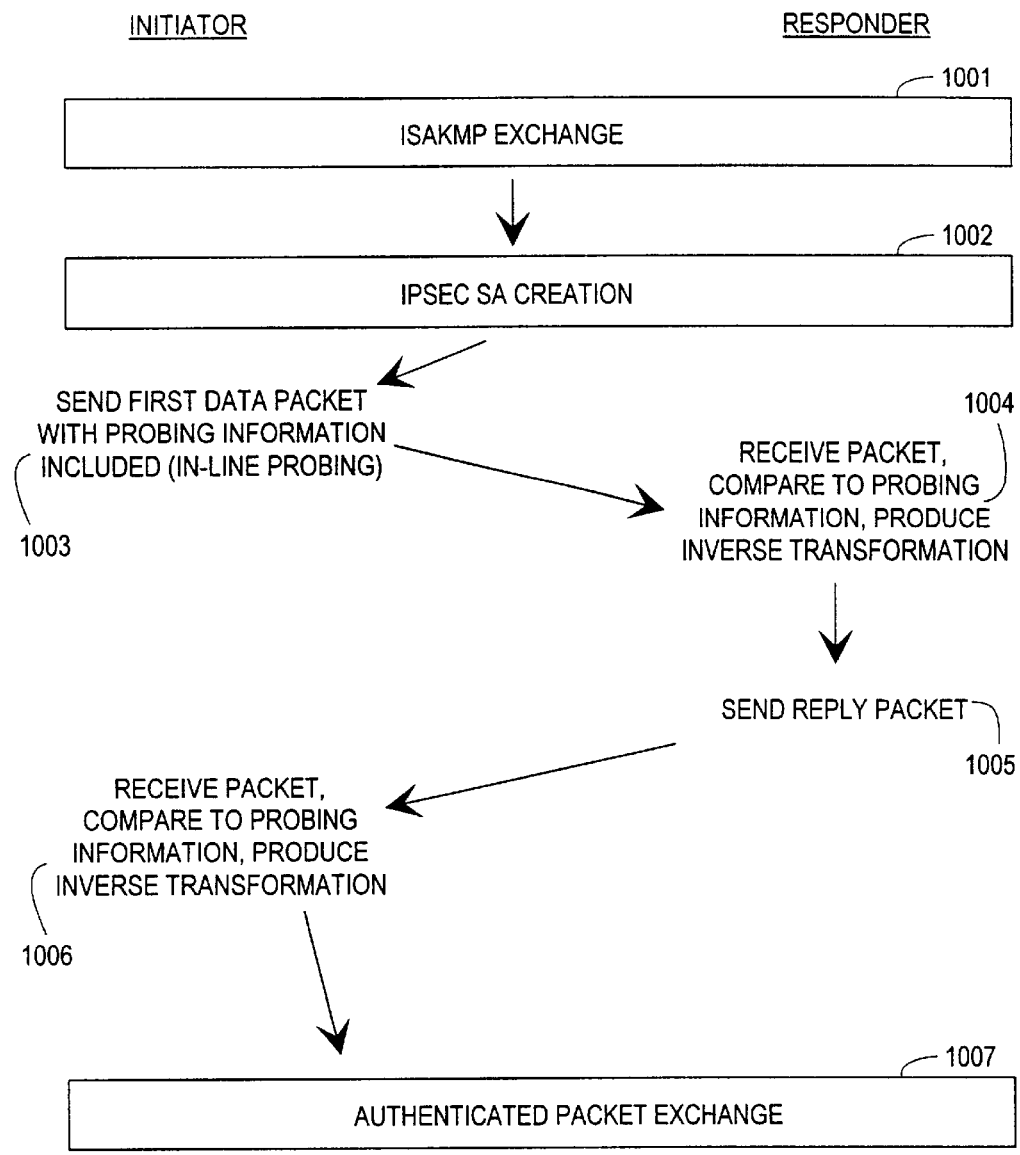
Figure 11:
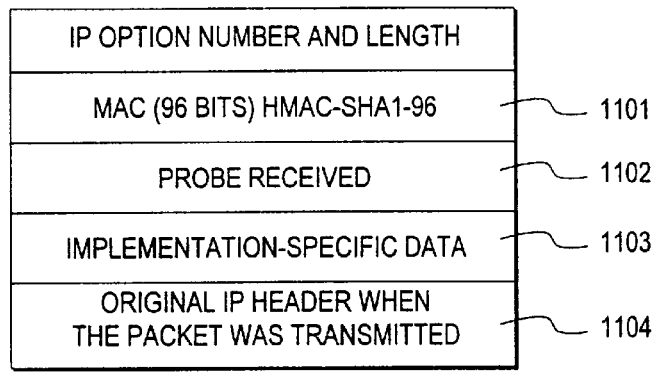
Figure 12:
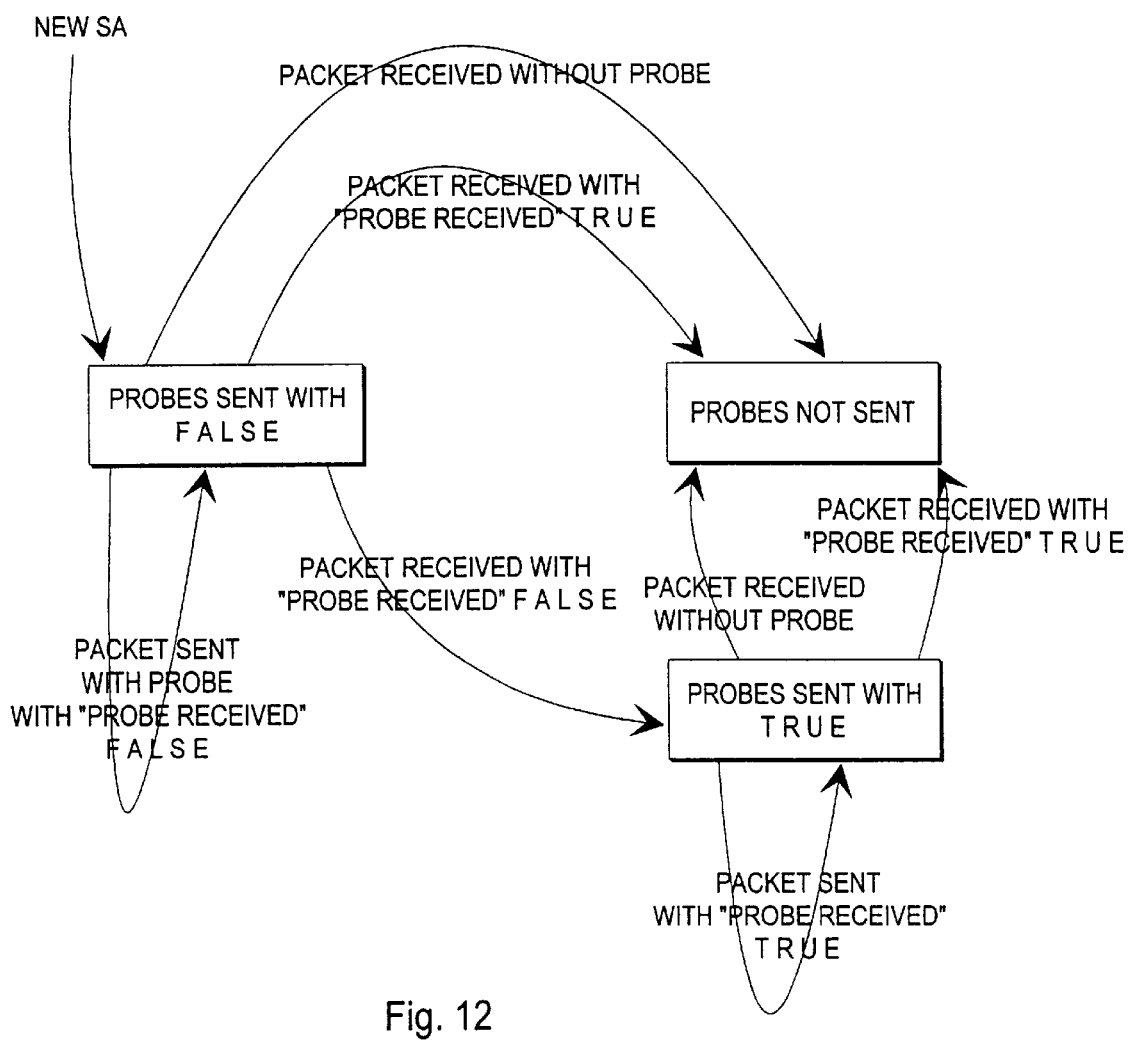
Figure 13:
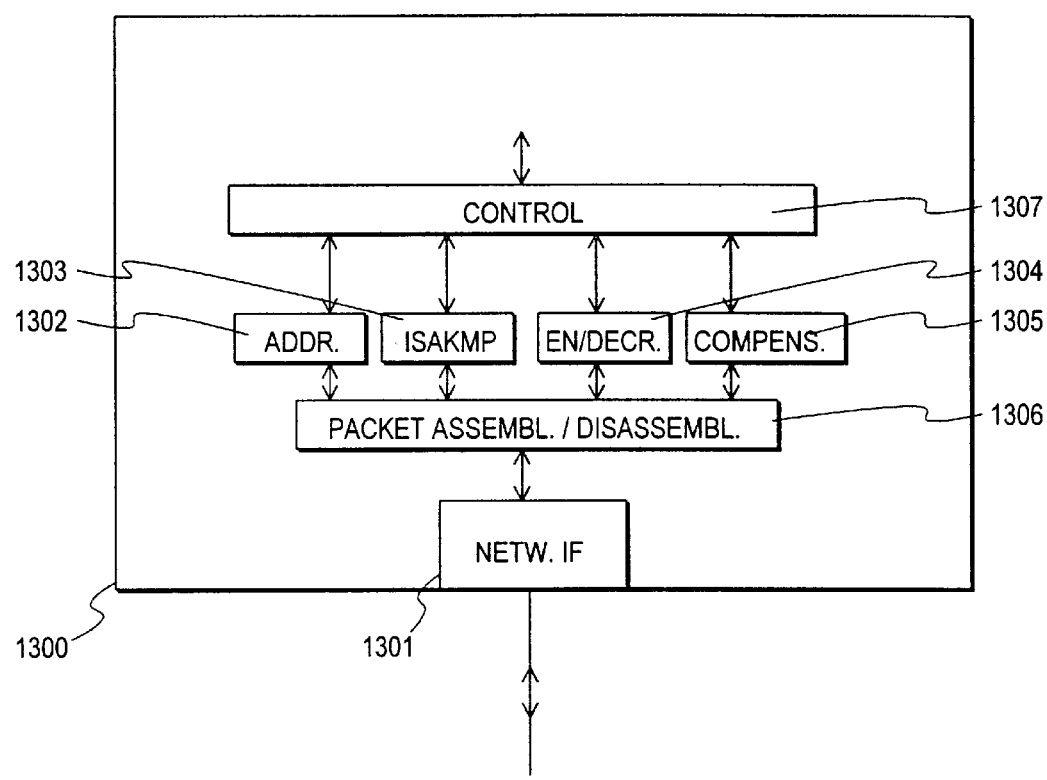

FIG. 1 illustrates a known NAT device between an internal network and an external network, FIG. 2 illustrates a known IPv4 packet header, FIG. 3 illustrates a known Ipv6 packet header, FIGS. 4, 5a and 5b illustrate known packet headers, FIG. 6 illustrates separate probing according to the invention, FIG. 7 and 8 illustrate different ways of manipulating a packet to be transmitted according to the invention, FIG. 9 illustrates in-line probing according to the invention, FIG. 10 illustrates an embodiment of the invention as a flow diagram, FIG. 11 illustrates a detail of FIG. 10, FIG. 12 illustrates an embodiment of the invention as a state machine and FIG. 13 illustrates a block diagram of a device according to the invention.

FIGS. 1 to 5b were referred to in the description of prior art, so the following discussion will mainly refer to FIGS. 6 to 13.

The invention is described in the context of the IP protocol and IPSEC and ISAKMP/Oakley mechanisms.

However, the present invention is equally applicable to other network protocols and other security mechanisms by replacing the protocoland mechanism-specific denominations and specifications in the following description with the corresponding counterparts in the other network protocols and other security mechanisms.

The present invention concerns a method for performing packet authentication when there are NAT (Network Address Translation) devices and/or protocol converters that modify the packet while it is in transit. The invention is also equally applicable to many other types of transformations that might be performed on the packet, such as removing certain IP options (e.g. source routing) or adding security options (e.g. IPSO or CIPSO).

The invention is based on the fact that it is possible to make authentication work over address transformations and/or protocol conversions by compensating for them either beforehand when generating the authentication code at the sending node or afterwards when verifying it at the receiving node. However, such compensation requires knowing the exact transformations that will be performed on the packet between the communicating peers. Many transformations are time dependent—for instance, the external addresses given by a NAT may vary over time on a first-come first-served basis. Even when the transformations are constant, configuring and maintaining the transformation information in a static manner for every pair of possible communicating nodes would be extremely operose.

In the method according to the invention one can dynamically discover which transformations are performed on any particular network connection at the time the communication takes place, and compensate for the transformations when performing packet authentication. The problem is thus divided to a number of subproblems: how can the discovery be done reliably and securely, which discovered transformations are considered acceptable, and how does one compensate for the transformations that occur while the packet is in transit.

The transformation characteristics of the path between the communicating nodes must be determined at a sufficiently small granularity. Here, sufficiently small granularity refers to ranges of network addresses (e.g. IP subnets, individual IP addresses, or even port numbers). For example, many NATs may map an IP address and port combination to another IP address and port combination. In such a case, the granularity is to a port. On the other hand, in a different environment the same fixed transformation might apply to an entire IP subnet or set of subnets. The implementation must ensure that the transformation characteristics are always determined separately for each "granule". Effectively, a granule here is the largest unit of network addresses (IP addresses, port numbers) within which the transformation can be guaranteed to be uniform.

Let us first consider the first subproblem named above, namely the dynamic discovery of the transformations that occur in transit. Such transformations may depend on the contents of the IP packet, particularly TCP and UDP port numbers. There is no easy method to explicitly compute the transformations beforehand, because the information needed (e.g. internal configuration and state of NATs) for such computation is not and cannot easily be made available.

In the method according to the invention the communicating peers probe the transformations that occur by sending at least one probing packet through the whole communication path between them, and watching what happens. The probing packet —or "probe" for short—must be sufficiently similar to real data packets so that the transformations performed on it are the same as those performed on actual data packets. The system receiving the probe must also be able to recognize it as a probe. Alternatively, this part of the invention can be implemented by including the probing information in the first data packet sent in each direction. We will call these two alternatives separate probing and in-line probing.

In some cases the transformation information may be manually configured for some destinations (possibly including the "default" destination). In such cases, there is no need to determine the characteristics by probing; instead, they can be directly determined from the configuration information. The setup in FIG. 1, for example, is sufficiently simple that manual configuration may be feasible in this case. However, manual configuration is generally not possible, as the needed information about e.g. IPv4 vs. IPv6 conversions might not be available at all.

Of the alternatives of separate or in-line probing, let us first look into separate probing. Here, the sending node 601 sends a separate probe packet 602 to the receiving node 603 according to FIG. 6. The receiving node must recognize the probe packet as such. The possibilities for this are limited, as the packet must use the same protocol (e.g. AH, ESP, TCP or UDP) and port numbers (when applicable) as the data packets. Alternatives for determining that it is a probe packet include:

Special contents in the data portion 702 of the packet 701 (e.g., a so-called magic cookie 703 negotiated by the key manager, or a derivation of such). This is illustrated in FIG. 7. The magic cookie 703 can be a sufficiently long bit string so that the probability of it occurring in a normal packet is extremely low (virtually zero).

Special flags in the headers of the packet (e.g., use a reserved flag in the IP, TCP, or UDP header), or have a strange value in some field.

Let us now consider comparing the sent and received packet headers as a part of the second subproblem defined above: which transformations are acceptable for compensation. There are several kinds of transformations that may occur on the packet, such as:

IP addresses and port numbers may change. This is typically caused by NAT. The mapping between "internal" and "external" addresses is fixed during a particular communication; however, the mapping might be different if/when the same addresses and ports are later reused.

IP options might be removed. E.g., some gateways may remove all source routing information.

IP options might be added. E.g., some gateways may add IPSO or CIPSO options to packets.

The packet is converted between IPv4 and IPv6. This involves changing the basic header layout, changing the order of IP options, translating addresses (though this may sometimes be fairly straightforward), and may change the way MACs are computed. This may also involve adding/removing some options, while some options might be transferred to the packet. The packet might undergo several such transformations back and forth, especially in the transition period that is likely to occur during the next several years. The sending node and receiving node may be using a different protocol for communication (e.g. one uses IPv4, and the other IPv6). One must also consider that different gateway implementations might process some options differently or order them differently.

The packet might be converted between IP and some completely different protocol, or might be converted between two completely different protocols. It may become extremely difficult or infeasible to maintain packet authentication across such conversions, but that is still a possible application of this invention.

The data portion of the packet might be modified in some situations, such as modifing the IP addresses contained therein in NAT devices to make the so-called DNS information correspond to the IP addresses seen inside the NAT.

The comparison can be performed by first checking against a conversion from one major protocol to another (e.g. IPv4 vs. IPv6). For IP, the rest of the comparison can be performed as follows:

The header is divided into fields, e.g. IP source address, IP destination address, protocol (TCP-UDP/other), source port, destination port, IP options, TCP/UDP options, etc. Most fields can be simply compared (e.g., addresses, protocol, ports). Some transformations are clearly always unacceptable (e.g., the protocol number communications will not be possible if the nodes do not support a suitable method for coping with them. If the receiving node in that case sends back a reply packet, it will not contain reply information for the probe. This can be used by the original sending node 903 to determine that the receiving node did not support probing. (Note that the receiving node will probably ignore the packet if transformations actually occurred.) If the receiving node did understand the probing information, the invention is applicable and the reply packet to the original sending node will include any reply information that needs to be sent to the original sending node, and its probe information if appropriate. From the viewpoint of the invention, this packet may or may not be non-disruptive, as the original sending node's capabilities are already partly known to the original receiving node when it sends its first reply packet.

The role of the reply packet is to confirm to the sending node 903 that the probe has been received and that the receiving node supports packet authenticated communications. If the original probing packet or the reply packet is lost in the network, it may need to be resent multiple times, forever or until a retry count is exceeded.

As explained above, non-distruptive in-line probing is a possible method for negotiating whether the other end supports the methods described in this disclosure, and performing the dynamic discovery at the same time. There are also other methods for negotiating whether the other end supports these methods, including:
it is negotiated using the key manager (e.g., with ISAKMP/Oakley, using vendor id payloads and/or extensions to the base protocol)
it is preconfigured on a per-network or per-host basis.

Irrespective of whether separate probing or in-line probing was used, a necessary requirement for being able to compensate for the transformations that occur is that the node (sending or receiving node) performing the compensation knows which transforms occurred. In a two-way connection compensation could be performed for each packet by the respective sending node, by the respective receiving node, or always by the same side regardless of the direction of the packet. Determining the transformations can most easily be done by comparing the received packet (header) against the packet (header) that was sent. To do this, either the received header must be communicated to the sending node or the sent header in its original form must be communicated to the receiving node. This communication may take place either as part of an in-line probing exchange, or through key manager communications, or by other methods. Both sending the original header to the receiving node and returning the received header to the sending node are viable options.

Special options in the IP, TCP or UDP header 802 (e.g. an IP option number reserved expressly for this purpose). This is illustrated in FIG. 8. A special option number is used for the option of identifing the packet as a probe.

The receiving node is put to a state where it will consider the next packet to a certain protocol, address and port combination as a probe. The state could be set and cleared by the key manager in communication with the sending node.

The invention does not limit the method that is used to recognise a probe in the receiving node.

After the separate probe has traveled the whole communication path and the receiving node has recognised it as a probe, the determination of which transformations occurred in transit can be done by comparing the original contents (headers, typically) of the probe against those seen at the receiving end. This comparison can be done either by the sending node or the receiving node. If it is done by the receiving node, sufficient information must be passed to it to make the comparison (either in the data portion of the probe packet itself, or by other communication, e.g. using the key manager). If it is done by the sending node, the receiving node must send back sufficient information about the received packet to enable the comparison. One possible form for passing the information is to send the full original or received headers to the other side in a packet's data portion. (Transformations that would modify the data portion of the packet are rare, and usually unacceptable from a security point of view.)

In the in-line probing embodiment of FIG. 9, the probing information is sent with the first data packet 901. There are two possible forms of in-line probing: non-disruptive and disruptive probing. In non-disruptive probing, the packet 901 will look like a completely normal data packet for the receiving node 902, and if the receiving node does not know of the probing mechanism used, it will ignore the probing information and process it as a normal data packet. In disruptive probing, on the other hand, the receiving node 902 will not be able process the packet normally if it does not know of the probing method.

Disruptive probing is similar to using a separate probe packet, except that the data for the first data packet is also included in the same IP packet as the probing information.

A non-disruptive probe is ignored by the receiving node 902 if it does not understand it, in which case the invention is not applicable: Packet authenticated changing), and will cause the comparison to fail. Other restrictions may be imposed by security considerations.

IP options may undergo several types of changes, such as addition, removal, or reordering. Typically, however, most packets do not have IP options, and very few options are commonly used or allowed by the local security policy. Even fewer options are likely to be changed. Most likely security considerations will permit only very specific types of changes.

TCP headers are probably seldom changed by normal network gateways. Most implementations can probably disallow changes in them.

Security considerations mean that one determines the risks of the authentication procedure either giving a false alarm, i.e. denies authentication despite that only legal transformations took place, or lets an illegal transformation go unnoticed. The acceptable level of risk may vary according to the importance of the data being transferred. Suitable risk levels and the consequent restrictions on what is considered a legal transformation may be found by experimenting without specific inventive activity.

It is conceivable that the transformations that occur on a path through a network might suddenly change while a communication is active. This might happen e.g. if a link is upgraded to use IPv6 instead of IPv4. Such changes will be rare, and can probably be ignored. However, if one wants to cope with them, it is possible to run the dynamic discovery procedure again when receiving incorrectly authenticated packets in the middle of an active communication. Care must be taken if such rediscovery is supported, however, in order to avoid denial-of-service attacks by sending just a few incorrectly authenticated packets.

Security considerations are critical in performing dynamic discovery of the transformations. Only some types of transformations are acceptable. If arbitrary transformations were allowed, attackers could fake source IP addresses and ports at will by making the other end think that a transformation occurred in the network.

The security problem is complicated by the fact that NATs often hide the actual IP addresses of the sending node and the receiving node. Each party will then only see addresses belonging to the other end's firewall, not addresses of actual machines.

If we assume that compensating for transformations is done by one end substituting the address seen at the other end during MAC compulation or verification, the node doing the substitution will need to know the other node's real address.

There is a way to avoid this requirement though. If each node behind a NAT can learn the IP address (and other information) that it will have outside the NAT gateway, it can compute the MAC using that information, and can communicate that information to the receiving node as its real address. A similar procedure applies to the receiving node.

Let us now return to security considerations. Basically, we want to authenticate that the received packets actually originated at the sending node that we think they are from. There are several possible sources of information about the true sending node, including:

It may be sent with the packet (in-line probing) by the sending node, authenticated by using whatever authentication key the peers have agreed upon. The identity of the sending node was brought to the knowledge of the receiving node when they agreed upon the authentication key.

It may have been communicated using the key manager as the identity associated with the particular security association. The information was authenticated during the key exchange between key managers.

It may be sent in a probe packet, authenticated by whatever authentication key has been agreed for the security association.

Assuming the packet is sufficiently protected by cryptographic means (both packet authentication and privacy protection), we do not really care which way it passes through the network. In that sense, we do not care about the IP addresses or ports in the packet, as long as we are sure that the keying information was negotiated with the appropriate real endpoint. That information must be (regardless of whether we apply the present invention) authenticated by means other than IP addresses, as IP addresses are unreliable.

There are several known methods currently used for authenticating the other communicating node and verifying its authorization to communicate, including:

manually configured, fixed keys ("you are allowed to communicate with anyone who knows the key")

dynamically agreed keys, authenticated by a preshared secret ("you are allowed to communicate with anyone who knows the secret")

certificate by a trusted CA ("you are allowed to communicate with anyone who has a certificate by the trusted CA")

certificate by a trusted CA for a particular network address range ("you are allowed to communicate with anyone who can present a certificate by a trusted CA for the IP address they are using")

certificate by a trusted authorizer giving the other node the authorization to communicate with another node (e.g. using a SPKI certificate)

other forms and policies are also possible, and are likely to evolve in the coming years.

Some of these methods directly yield the identity of the communicating remote node or user (e.g., in the form of a name associated with the certificate by a trusted CA); some only yield authorization but say nothing about the identity of the remote node or user.

In any case, the IP address and port number used by the remote node has little value for authentication purposes when NAT is used, as the address will be more or less random (within an address range typically).

It is thus the case that the IP address and port are not really usable for authentication in the presence of NAT, even if traffic is otherwise authenticated. Authentication of the communicating nodes must be done using certificates or other information exchanged as part of the key exchange protocol.

Thus, we do not really care about the IP address that is shown to the receiving node. That address need not be authenticated (and there isn't much that could be done to authenticate it, short of requiring a certificate listing the range of addresses the NAT gateway might translate it to).

The information communicated to the node performing compensation, however, should be authenticated to avoid attacks where a bogus address is passed to compensate for changes elsewhere in the packet. It can be argued that a good MAC would not allow determination of a compensating address, but it is safer to always authenticate the address. It may be convenient to authenticate the information communicated using the same authentication key that is used to authenticate the rest of the packet.

A node's local security policy determines which transformations it will consider acceptable for each form of authentication obtained. Many such policies are possible. One possible policy is outlined below:

Do not allow changes in protocols other than IPv4 and IPv6.

Accept IPv4 vs. IPv6 transformation, compensating for format changes.

Accept arbitrary changes in the source address and port of the initiator of the communication; do not allow changes in the destination address of the initiator or in the source address of the responder, unless explicitly allowed by the responder's certificate. However, the translation between an IPv4 and the corresponding IPv6 address (as specified in the IPv6 address definitions) is always allowed.

Do not allow changes in the protocol number (TCP vs. UDP vs. other); ignore port numbers for protocols other than TCP and UDP.

Do not accept changes in IP options, TCP options, or other parts of a packet.

The invention does not limit the choice of policy.

The security policy is usually implemented as a check against a configuration database. However, in many applications the security policy or some aspects of it are static. Such static aspects are often implemented implicitly in the code. For example, allowing any change in some header field could be implemented as just not checking for that field. Likewise, requiring some field (or protocol) to have a specific value may be a simple comparison, and may even be made implicitly by e.g. packet routing code or other unrelated code on the platform where the method is implemented.

Once the transformations that occur have been determined, they must be compensated for by one or both of the communicating nodes, which is the third subproblem defined above. If in-line probing is used, the probe packet itself contains enough information for the receiving node to compensate for any acceptable transformations; however, including such information in every packet is not desirable because it wastes network bandwidth. Thus, it is probably desirable to keep record in the compensating node about the transformations that occur, and compensate for the transformations using recorded information, instead of including explicit compensation information in every packet.

Compensation may be performed either when computing the MAC when sending a packet, or when verifying the MAC after receiving a packet.

The MAC is normally computed from the packet contents and a secret key by using a suitable cryptographically strong hash function (or other function that mixes bits together in an intractable way) as follows:

The secret key is included in the MAC.
The packet data is included in the MAC.
All applicable parts of the packet header are included in the MAC. There are some fields that normally change while a packet is being transmitted, such as the TTL field. These are not included in the MAC computation (or are zeroed before MAC computation). Most other fields are included in MAC computation.
Source and destination addresses are normally included in MAC computation.

In ESP, the MAC normally only covers packet data, not the header. However, higher-level protocol checksums (e.g., TCP or UDP checksums) may contain data from the header.

The MAC is typically a bit vector where every bit depends on every bit included in the MAC in an intractable way. The number of bits in the MAC is sufficiently large (in other words, the MAC is sufficiently strong) so that it is not feasible to find data matching a particular MAC. The idea is that it is not possible to produce a MAC that could be successfully verified with a particular key without knowing the key.

To compensate for transformations at the sending node, the sending node applies the transformations seen by the receiving node before it computes the MAC. Thus, the MAC in the transmitted packet does not match the packet that the sending node sends, but it will match the packet that the receiving node sees.

To compensate for transformations at the receiving node, the receiving node applies reverse transformations to the received data before computing the MAC. Thus, the sending node will send a packet that has a correct MAC, and the receiving node will convert the packet to the form sent by the sending node before verifying the MAC.

In addition to compensating for changes just in the MAC, the compensating node may perform additional compensation operations that would normally be performed by the NAT device if packet authentication was not happening. For example, TCP or UDP checksums may be updated according to the changes that occurred on the packet. Such update may be implemented either as an incremental update (essentially deducting old values and adding new values to the checksum), or by recomputing the entire checksum.

In the case of ESP packets, it is sometimes possible to avoid the dynamic discovery and MAC compensation subprocess entirely. This is because the ESP packet header is not included in the MAC, and thus the MAC need not be computed. The security policy may state that any transformation in the packet header (IP addresses) is acceptable, as long as a valid MAC was present in the packet. If operation over NAT only needs to be supported for ESP and only with a fixed security policy that allows any change in the outer IP header, then this invention can be implemented as simply recomputing the checksum of any received TCP or UDP packet.

Sometimes the authenticated/encrypted packet contains network addresses within the data portion. An example is a DNS (Domain Name System) packet; such packets are used to map host names into IP addresses. Many NATs perform transformations on the contents of DNS packets; such transformations become impossible if the packet contents are protected. In such a case, it may be necessary to perform some or all of the transformation on the packet contents as part of the compensation phase.

Some NATs may also recognize the security protocol, such as IPSEC, and perform special mappings on the SPI (Security Parameter Index) values in the packets. The compensation may also include changing the SPI value to that in the original value. In such a situation, the original SPI value would be communicated in the probe packet.

Let us now consider one possible implementation of this invention in detail with reference to the flow diagram in FIG. 10. For simplicity, this implementation only deals with the IPv4 protocol, and is only intended to cope with IPv4 NATs (IP address and port transformations for TCP and UDP protocols). However, it will be obvious to those skilled in the art how this could be extended to cope with IPv4-IPv6 protocol conversions or other types of transformations. We assume that the IPSEC mechanism is used for authentication of IPv4 packets. We do not consider encryption; however, the authentication can equally well be performed using ESP headers, potentially combined with encryption, as it is here described using AH headers.

Let us call the communicating nodes Initiator and Responder. Initiator is the node that sends the first packet to start communications; Responder is the one that the first packet is sent to (and typically it will respond to that packet by sending one or more reply packets back). In the description below, we will restrict ourselves to the case where a NAT gateway separates the Initiator from the Internet, and the Responder is visible on the Internet using its own IP address and real port numbers. This general setup is known as such and was illustrated in FIG. 1.

When the initiator wishes to communicate with the Responder, and they haven't communicated recently (i.e., there is no security association set up between them yet), the initiator first starts an ISAKMP exchange generally designated as 1001 with the responder. This is normally done by sending an UDP packet to port five hundred (where five hundred is the port number and not a reference designator) at the Responder's IP address. The NAT will replace the source address and source port in the packet. The key managers of both the Initiator and the Responder exchange ISAKMP packets and set up a ISAKMP security association between the key managers. As part of this process, they authenticate (or authorize) each other using any method supported by ISAKMP.

Next, an IPSEC SA (security association) is created between the Initiator and Responder (actually two, one in each direction) at the stage generally designated as 1002. A shared secret is associated with each SA, which is used to derive keying material for the IPSEC transforms (encryption and authentication algorithms) used to protect traffic sent using the SA.

It is possible that some transformations occurred on the ISAKMP packets during the key exchange. However, those transformations cannot be used to determine the transformations that will occur on data packets, as data is transferred using a different port number and might have a different mapping. Up to this point the connection setup has proceeded according to prior art.

The first data packet is then sent from the Initiator to the Responder at stage 1003. The packet will be authenticated and otherwise protected using the AH and ESP headers as negotiated during key exchange. Additionally, a special IP option is added to the packet. This IP option has a special, reserved number, and is used to probe the transformation characteristics of the communications channel between the Initiator and the Responder. This is a variation of non-disruptive in-line probing. The format and contents of this option are described in FIG. 11. The MAC 1101 can be for instance the first 96 bits of HMAC-SHA1 of the rest of the option using the same key as the authentication transform used for the packet. The value of the "Probe received" field 1102 will be FALSE to indicate that we have not yet received a probe packet from the other side. Implementation-specific data 1103 can be any data that needs to be communicated to the other side, such information about the features supported by the Initiator. The original IP header when the packet was transmitted 1104 is also shown.

It is interesting to note that even though NATs change port numbers, the AH/ESP encapsulation will hide the TCP/UDP header from the NAT, and thus the NAT will most likely not be able to modify port numbers. This may also turn out to have an adverse effect on NAT performance, as they must now allocate one external address for every internal address that has a connection open, instead of multiplexing several to the same address by modifying port numbers. This invention is also applicable in those cases where a NAT changes port numbers inside an AH/ESP header.

If other packets are sent by the Initiator to the Responder before receiving a probe reply, those packets will contain a similar probe option.

When the Responder receives a packet of this format at stage 1004, it compares data in the received probe option against information in the received IP packet. It uses this comparison to produce an inverse transformation for the transformation that occurred while the packet was in transit. This data is recorded for use in processing future packets received using the same SA, and for replying to the Initiator when the first packet is sent to it.

When the Responder sends its first packet to the Initiator at stage 1005, it checks whether a probe option was present in the first packet received from the Initiator. If so, it includes a probe option of its own. This probe option is identical to that sent by the Initiator, except that the "probe received" field will be TRUE to indicate that the Responder has already received a probe and no more probes need to be sent by the Initiator.

In its next packet after receiving this packet at stage 1006, the Initiator will still include a probe option, which will now have "probe received" TRUE to indicate that the responder need not send more probes. If the exchange of packets has proceeded smoothly, the dynamic discovery of address translations (and protocol conversions, although not specifically discussed with reference to FIG. 10) is complete and the Initiator and Responder may continue exchanging packets as symbolized at 1007, processing future packets received using the same SA in accordance with the information about the address translations (and protocol conversions) stored at stages 1004 and 1006.

However, there might be complications. The system needs to be able to deal with lost packets. There is also a small chance that the Responder might spontaneously want to send a packet to the Initiator after the SAs between them have been set up but before it has received the first packet from the Initiator.

The proper operation with regards to sending probes can be summarized by the state machine of FIG. 12. The concept of state appertains separately for each SA.

A problem which was not addressed above is the granularity of security associations vs. the granularity of transformation information. An SA could be between entire subnets, covering multiple hosts, or could be e.g. for one TCP/IP port pair only. Tranformation information, on the other hand, is typically constant only per-host or even only per-port (it cannot be per-port if port information is not visible to the NAT due the AH and ESP headers).

This raises the question where to store information about the transformations, in the SA or in a separate data structure that records the transformation information for each host/port, possibly linked to the SA. Both approaches are possible. Here we assume information separate data structure is used to record transformation information separately for each host covered by the SA.

FIG. 13 is a simplified block diagram of a network device 1300 that can act as the Initiator or the Responder in the method of FIG. 10. Network interface 1301 connects the network device 1300 physically to the network. Address management block 1302 keeps track of the correct network addresses, port numbers and other essential public identification information of both the network device 1300 itself and its peer (not shown). ISAKMP block 1303 is responsible for the key management process and other activities related to the exchange of secret information. Encryption/decryption block 1304 implements the encryption and decryption of data once the secret key has been obtained by the ISAKMP block 1303. Compensation block 1305 is used to compensate for the permissible trans-formations in the transmitted and/or received packets according to the invention. Packet assemble/disassembler block 1306 is the intermediator between blocks 1302 to 1305 and the physical network interface 1301. All blocks operate under the supervision of a control block 1307 which also takes care of the routing of information between the other blocks and the rest of the network device, for example for diaplaying information to the user through a display unit (not shown) and obtaining commands from the user through a keyboard (not shown). The blocks of FIG. 13 are most advantageously implemented as pre-programmed operational procedures of a microprocessor, which implementation is known as such to the person skilled in the art. Other arrangements than that shown in FIG. 13 may as well be used to reduce the invention into practice.

What is claimed is:

1. A method for achieving packet authentication according to an applicable security policy between a sending node (903) and a receiving node (902) in a network which includes entities which carry out transformations on packets, characterised in that it comprises the steps of dynamically discovering (1003, 1004) said transformations occurring to a packet en route between said sending node and said receiving node, checking (1004) that transformations which have occurred on packets (hereafter dynamically discovered, acceptable transformations) are acceptable based on the applicable security policy, and compensating (1004, 1006) for said dynamically discovered, acceptable transformations before authenticating packets transmitted from said sending node to said receiving node.

2. A method according to claim 1, wherein each packet transmitted from said sending node, before any said transformations, will be referred to as an original packet and has contents including a header, characterised in that each packet transmitted from said sending node (903) to said receiving node (902) includes a cryptographic authentication code (1101) derived from a secret key and the contents of the original packet.

3. A method according to claim 2, characterised in that to compensate for said dynamically discovered, acceptable transformations said contents of said original packet are manipulated at said sending node (903) before computing said cryptographic authentication code (1101).

4. A method according to claim 2, characterised in that to compensate for said dynamically discovered, acceptable transformations said contents of a received packet are manipulated at said receiving node (902) before verifying said cryptographic authentication code (1101).

5. A method according to claim 4, characterised in that at least one data packet (602, 901) transferred from said sending node (903) to said receiving node (902) contains a saved copy of at least a part of said original packet header (1104), and said receiving node uses said saved copy of said at least part of said original packet header when verifying said cryptocraphic authentication code of a received packet.

6. A method according to claim 5, characterised in that said saved copy of said at least part of said original packet header is stored in a special option of a packet header of said received packet.

7. A method according to claim 6, characterised in that said special option is an IP option.

8. A method according to claim 5, characterised in that said saved copy of said at least part of said original packet header is cryptographically authenticated.

9. A method according to claim 1, characterised in that the underlying protocol applied in transferring packets from the sending node to the receiving node is the IPv4 protocol, and packet authentication is done using the IPSEC protocol.

10. A method according to claim 1, characterised in that the underlying protocol applied in transferring packets from the sending node to the receiving node is the IPv6 protocol.

11. A method according to claim 1, characterised in that said transformations include IP address translations (100).

12. A method according to claim 1, characterised in that said transformations include TCP/UDP port translations.

13. A method according to claim 1, characterised in that the step of compensating (1004, 1006) for said dynamically discovered, acceptable transformations comprises the substep of updating a TCP or UDP checksum.

14. A method according to claim 1, characterised in that said dynamically discovered, acceptable transformations include conversion between the IPv4 and IPv6 protocols.

15. A method according to claim 1, characterised in that said step of dynamically discovering said acceptable transformations is made using a probing method taken from the following group of probing methods: non-disruptive in-line probing, disruptive in-line probing, separate probing.

16. A method according to claim 15, where said probing method comprises the step of sending a probe (1003) from said sending node to said receiving node, characterised in that said probe is a packet sent to a network address which is a network address to which normal data packets directed to said receiving node are addressed.

17. A method according to claim 16, characterised in that as a response to receiving said probe said receiving node sends a probe reply (1005) to said sending node.

18. A method according to claim 1, characterised in that said communicating nodes, comprised of said sending node and said receiving node, negotiate whether both communicating nodes support authentication in the presence of transformations on said packets as they traverse a data path between said communicating nodes.

19. A method according to claim 1, characterised in that it comprises the step of ensuring that the characteristics of said dynamically discovered, acceptable transformations are determined at a level of detail sufficient to account for all transformations on the path between said communicating nodes that need to be compensated for when authenticating a packet.

20. A method for achieving packet authentication for packets comprising a header structured according to an applicable security policy and transmitted between a sending node (903) and a receiving node (902) in a network wherein transformation on contents of said packets occurs as said packets propagate across a data path couplina said sendina node to said receiving node, characterised in that said packet authentication method comprises inclusion in each said packet of a message authentication code (MAC) computed using an authentication code mechanism that does not include said packet header in the data used to calculate said message authentication code discovering transformations that occur on said content of said packets as they propagate across a data path coupling said sending node to said receiving node, and determining whether said discovered transformations are acceptable based on said applicable security policy, and compensating for any acceptable transformations in said packets before authenticating packets transmitted from said sending node to said receiving node by decrypting said message authentication code using a secret shared by both said sending node and said receiving node.

21. A network device (1300) for transmitting digital information in packet authenticated form according to an applicable security policy to another network device in a network wherein transformations on content of packets occurs as said packets propagate from said network device to said another network device, characterised in that it comprises means (1305, 1306, 1307) for dynamically discovering said transformations occurring to a packet en route between said network device and said another network device, checking that said discovered transformations are acceptable based on said applicable security policy, said transformations being hereafter referred to as dynamically discovered, acceptable transformations, and compensating for said dynamically discovered, acceptable transformations before transmitting packets to be authenticated to said another network device.

22. A network device (1300) for receiving digital information in packet authenticated form according to an applicable security policy from a sending network device in a network wherein transformation on content of packets occurs as they propagate to said network device from said sending network device, characterised in that it comprises means (1305, 1306, 1307) for dynamically discovering said transformations occurring to a packet en route between said network device and said sending network device, checking that said discovered transformations are acceptable based on the applicable security policy, said discovered transformations that are deemed acceptable being hereafter referred to as dynamically discovered, acceptable transformations, and compensating for said dynamically discovered, acceptable transformations before authenticating packets received from said sending network device.

* * * * *